(12) United States Patent
Waterman et al.

(10) Patent No.: US 8,540,172 B2
(45) Date of Patent: Sep. 24, 2013

(54) REPLACEABLE RESERVOIR

(75) Inventors: David Waterman, Oxford (GB); Alastair Pirrie, Oxford (GB)

(73) Assignee: Atrium Innovation, Limited, London (GB)

(*) Notice: Subject to any disclaimer, the term of this patent is extended or adjusted under 35 U.S.C. 154(b) by 488 days.

(21) Appl. No.: 11/572,674

(22) PCT Filed: Jul. 28, 2005

(86) PCT No.: PCT/GB2005/002991
§ 371 (c)(1),
(2), (4) Date: Jan. 29, 2008

(87) PCT Pub. No.: WO2006/010944
PCT Pub. Date: Feb. 2, 2006

(65) Prior Publication Data
US 2008/0265067 A1 Oct. 30, 2008

(30) Foreign Application Priority Data
Jul. 29, 2004 (GB) .................................. 0416941.3

(51) Int. Cl.
*B05B 5/00* (2006.01)
*F23D 11/32* (2006.01)
(52) U.S. Cl.
USPC ................ 239/706; 239/705; 239/690.1

(58) Field of Classification Search
USPC ................... 239/690, 690.1, 705–708
See application file for complete search history.

(56) References Cited

U.S. PATENT DOCUMENTS

| | | | | |
|---|---|---|---|---|
| 4,401,274 A | * | 8/1983 | Coffee | 239/690 |
| 5,067,843 A | * | 11/1991 | Nova | 403/301 |
| 5,184,778 A | * | 2/1993 | Noakes | 239/691 |
| 5,292,067 A | * | 3/1994 | Jeffries et al. | 239/3 |
| 5,529,224 A | * | 6/1996 | Chan et al. | 222/212 |
| 5,992,771 A | * | 11/1999 | Noakes et al. | 239/690.1 |
| 6,460,781 B1 | * | 10/2002 | Garcia et al. | 239/327 |
| 2007/0114305 A1 | * | 5/2007 | Yamaguchi et al. | 239/690 |

* cited by examiner

*Primary Examiner* — Len Tran
*Assistant Examiner* — Justin Jonaitis
(74) *Attorney, Agent, or Firm* — Ted Sabety, Esq.; Sabety + associates, PLLC

(57) ABSTRACT

A sachet (1) having walls of flexible material is disclosed. The walls are joined so as to form an impermeable seal, thereby defining a cavity within the sachet (1). A conduit (2) passing through the seal and having inner and outer ends is disposed with the inner end within the cavity and the outer end outside the sachet (1) such that the cavity is in fluid communication, via the conduit, with the outside of the sachet. The cavity contains a volume of liquid (8) in use, and the conduit (2) is adapted to prevent the liquid (8) flowing from the cavity without the application of an additional stimulus, irrespective of the orientation of the sachet (1).

28 Claims, 15 Drawing Sheets

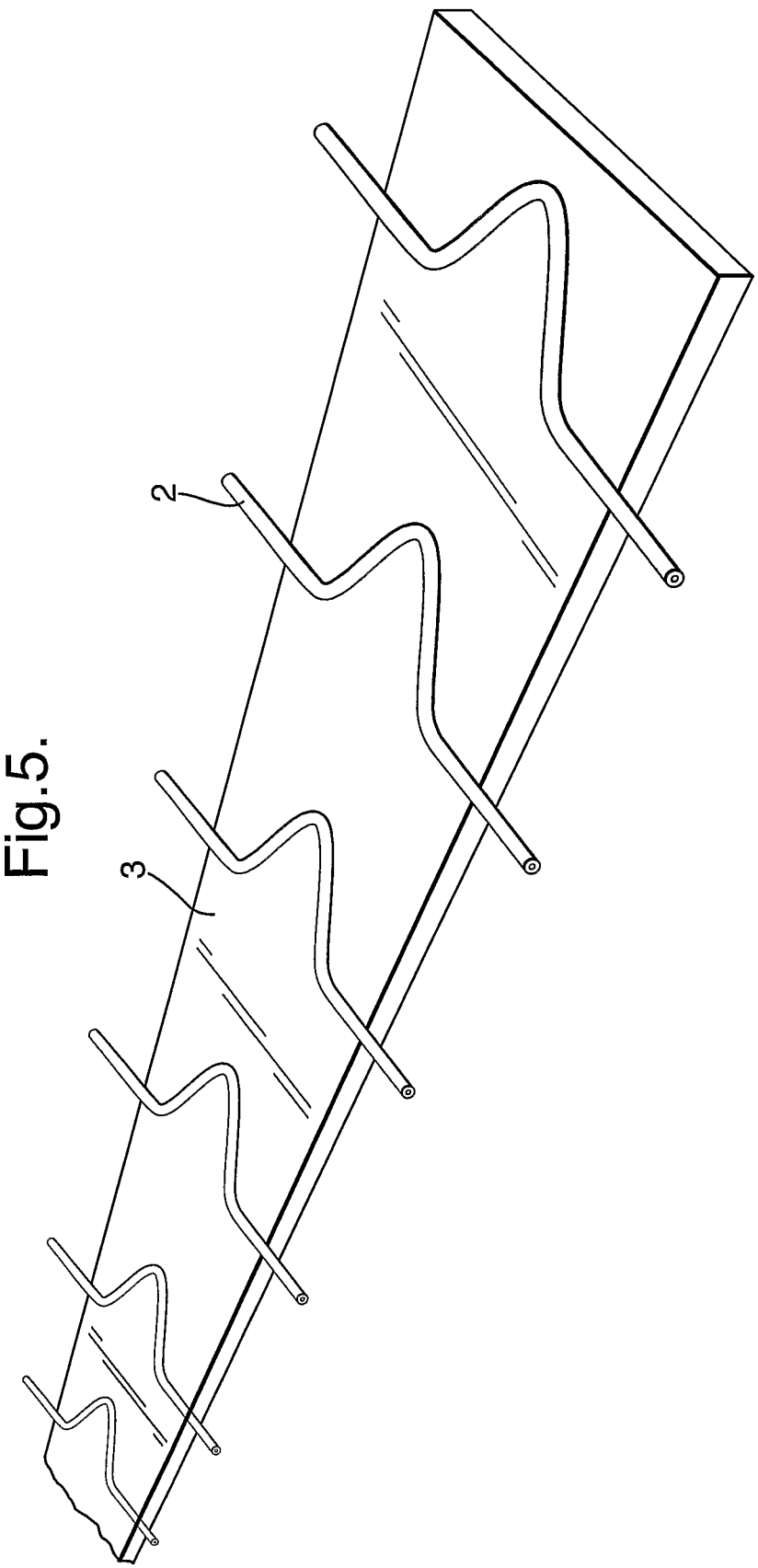

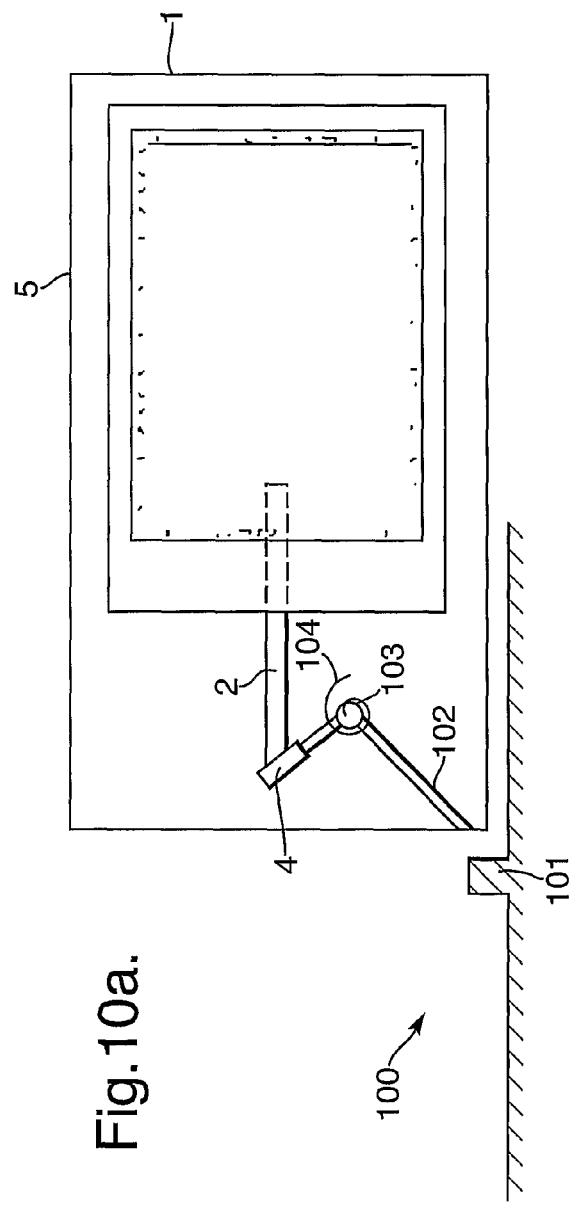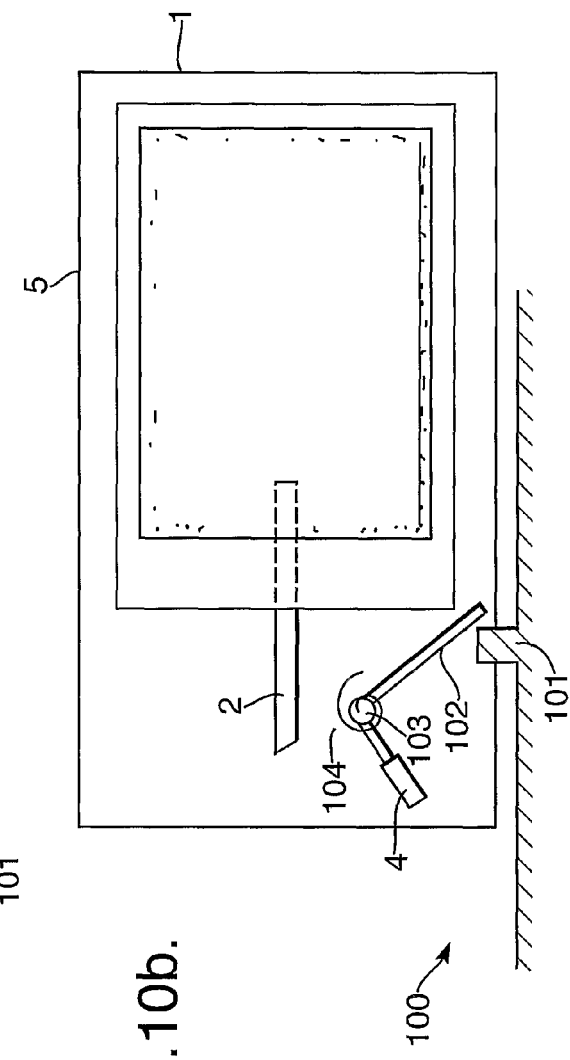
Fig.10a.
Fig.10b.

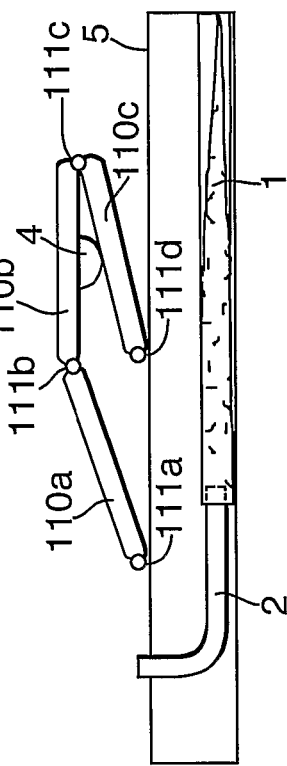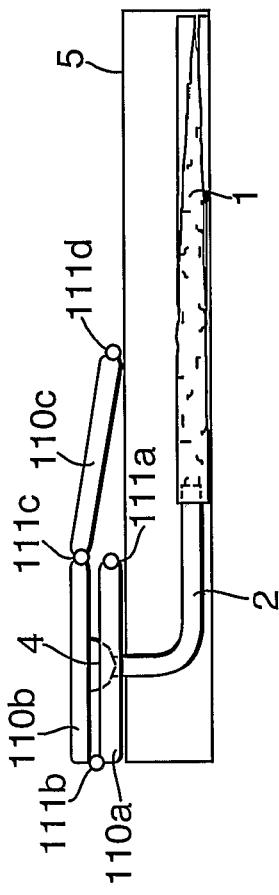

REPLACEABLE RESERVOIR

This application is a 371 National Stage Entry of PCT/GB2005/002991 filed on Jul. 28, 2004.

This invention relates to a flexible sachet. This type of sachet is typically used to store a liquid to be dispensed and then disposed of after the liquid has been dispensed. The invention also relates to a method of manufacturing the sachets.

Reservoirs with flexible walls that permit the differential in pressure between the inside and outside of the reservoir to be equalised as the fluid is dispensed are already used widely. Their principal advantages are that they shrink during the process of dispensing to a much smaller volume, facilitating easy disposal and that because no air is required to replace the dispensed fluid, the contents of a partially used reservoir remain unexposed and hence stay "fresher" for longer. Here follows a discussion of the prior art relating to collapsible fluid containers using firstly very general examples, which are followed by more specific storage and delivery systems of increasing complexity.

Single use sachets, which are usually torn open to access their contents, represent one of the simplest embodiments of flexible-walled containers. Designed for a single dispensing operation, a pouch formed by completely sealing the perimeters of two opposing sheets of flexible material, includes a portion that can be purposefully torn away to expose the contents. The manner in which the contents flow from the container is largely uncontrolled, both in direction and flow rate, and there is no provision for effectively resealing the sachet after it has been torn open. Such embodiments are commonly used where the pouch contains an appropriate measure of the desired fluid. Whilst modifications to the shape of the wall material and the places in which it is sealed can delimit a defined exit route, these spout-like features offer little control overflow rate and have an inherent tendency to collapse themselves, resulting in inconsistent cross-sectional area.

In other single use applications, a rigid conduit can be included via a force-fit into a channel within the sealed pouch, so that once a tear strip has been activated to expose the end of the conduit, the contents can be squeezed more controllably from the bag. An example of this is shown in US2003/0163110, which has also been published as WO02/22044. Long-term and reliable resealing of these integral conduits, after they are exposed, is rarely provided for. One example where resealing is achieved, albeit in a temporary manner, is described in WO02/36341, where a flexible drinking straw is sealed into the pouch during manufacture together with an additional sealing arrangement in the form of a flap closure that encloses, kinks and compresses the straw to prevent flow through the conduit until this is desired.

Another method in which the contents of sealed pouches are finally accessed is by breaching the pouch wall material using a piercing conduit. The Capri-Sun® drink pouch is a well-known embodiment of this method. A detachable straw sharpened at one end is provided on the outside of the pouch to be used to carefully pierce the packaging at a predefined location, where the outer layer of the multilayer package has already been die cut to expose the aluminium foil and the internal plastic layer beneath. Attempts to pierce the package at other locations than the pre-defined one are usually not successful due to a tough outer layer of plastic. However, no seal is formed between the conduit and the wall of the pouch and no resealing of the conduit or pouch is provided, therefore restricting the device to single use over a short period and requiring that the level of the liquid remains below the predefined piercing location at all times.

Better single-use seals can be achieved via careful arrangement of the wall material and the piercing location, such as described in U.S. Pat. No. 4,078,699, where fluid pressure around the inserted conduit is used to close a seal between its outer surface and double folds in the pouch material at the insertion location. However, this sealing method is less effective for low surface tension fluids and the double fold seal requires a significant pressure differential to compress the materials together sufficiently in order to maintain an effective seal.

Other devices provide a reusable seal around the inserted conduit and allow the bag to remain sealed after the conduit has been subsequently removed. An example of this method can be seen included in high capacity (approximately 1 liter) ink refills for industrial printers as fitments specially designed to accept and seal around a conduit attached to the cartridge to be refilled. These fitments ensure a reliable seal and also incorporate a valve system so that the bag can be resealed after the conduit has been removed from the septum.

For conduits made from rigid fitments, integral to the wall or end of the bag, initial sealing and resealing can also be achieved using a plug or screw-on cap, such as that described in U.S. Pat. No. 6,000,848. A more sophisticated solution is used for wine boxes, in which a cardboard box houses a wine-filled sealed bag. The contents of the bag are accessed via a manual valve fitment, integrally sealed into a wall of the bag during the bag's fabrication. However, whilst these systems work well for large volumes (>100 ml) of substantially water-based products (where the high surface tension makes them more easy to seal and there is generally a low risk of chemical attack), smaller volumes and bags that have to be made from materials resistant to aggressive chemical contents, hence requiring thicker or more rigid materials and adhesives, suffer from incomplete bag collapse and a large proportion of the contents cannot be accessed without additional pumping.

Greater sophistication is evident in the collapsible bag systems used within some inkjet printer cartridges, which, once installed, can remain leak free yet dispense their contents on demand from the printer without manual intervention. Fluid communication between the bag contents and the print head is either completed by a conduit on the printer that couples in a sealable fashion with the cartridge, or the refill includes an integral (disposable) print head, which remains in direct communication with the contents of the bag at all times. Such devices often require methods to forcibly separate the two opposing walls of the bag in order to create a sub-atmospheric pressure inside the bag that prevents ink flowing through the print head at times other than when the print head is activated by the printer. However, for fragrances, pharmaceuticals and other liquids, cross-contamination and its effects, such as unwanted chemical reactions and degrading of the intended effect can present a much greater problem. For this reason it is advantageous to replace all parts of a spray system that have come into contact with fluid being sprayed, from the reservoir itself through to its discharge at the tip of the nozzle.

Though reservoirs with flexible walls and dispensing conduits are well known, they all suffer from inherent shortcomings when used in applications involving low surface tension fluids and/or applications where the forces involved in withdrawing the fluid from the reservoir are to be very small. These shortcomings invariably result in either leakage of fluid in the absence of additional valves or in a resistance to dispensing that prevents the contents (or a significant proportion of the contents) being withdrawn. Whilst print cartridge technology provides for automated and controlled dispensing of fluid over both sustained periods of use and standby time, it relies on the high surface tension of a water-based fluid (which is approximately four times that of perfume oils) and the availability of withdrawing forces offered by a typically mains-driven printer working in conjunction with a print head whose conduits are of the order 20 microns (approximately twenty times smaller that that of an electrostatic spray nozzle). This possibility and availability of forces that are roughly two orders of magnitude greater than those associated with electrostatic spraying means that the technology is non-transferable because the difference in surface tension and the difference in conduit diameter are intrinsic to the different applications, for example the diameter of the electrohydrodynamic nozzle relates to manufacturability and resistance to blockage. Also, print cartridges, especially those with sub-atmospheric internal bag pressures, increasingly resist the dispensing of the fluid as the level in the reservoir drops, which would seriously affect the ultimate flow rate for devices that employ venturi or electrostatic delivery systems. This problem does not arise in printers because a positive displacement pumping system can be employed. Furthermore, the complexity associated with printer cartridges puts a lower limit on the cost of manufacture that inhibits the commercial viability of disposable systems for smaller volumes and shorter-term applications.

More specifically, where devices in the prior art are disposable and sufficiently general in their use to be considered for the storage and low force delivery of fluids such as fragrances, pharmaceuticals, pesticides and so on their shortcomings ultimately make them unviable due to inadequate sealing/resealing, inconsistent flow rates, incomplete emptying, and unreliable positional accuracy of integral conduits (typically rotationally undefined). Incomplete emptying is a particular problem, when 5 ml of fluid can remain in folds of the wall material that have not flattened completely (and even more than 5 ml for double pleat "stand up" designs) and a further approximately 5 ml can remain in the close vicinity of a fitment, whose thickness physically separates the opposing walls to which it abuts, leaving an uncollapsible volume as well as distorting the wall materials, an effect often described as "webbing" and therefore inhibiting flattening further away from the fitment. These inaccessible volumes of fluid are acceptable for high initial volumes, where they represent less than 10% of the usable liquid, but become a severe disadvantage at lower volumes, especially where the liquid is costly in comparison to the reservoir system and ultimately prevent miniature refills with start volumes of around 5 ml. These shortcomings are inherent to the designs taught in the prior art because they have been developed for purposes other than storage of fragrances, pharmaceuticals, pesticides and so on where the contents' cost, quantities, period of use, chemical composition and physical properties are considerably different. Thus the prior art inhibits miniaturisation due to the impaired functionality of its designs at smaller scales, typically by leaving proportionately more unused fluid in the reservoir to be disposed of at the end of the product's useful life. Furthermore, other than print cartridge technology, these devices are primarily designed for rapid use (typically within one day) and direct human interaction, and thus have the disadvantage of requiring human supervision to ensure they are used within their operational limits and that any failures, such as spillage, excessive flow rate, or trapped contents are attended to during use.

Another disadvantage that limits miniaturisation and unsupervised deployment is that the valves and sealing mechanisms available for existing flexible reservoirs typically require manual operation and hence rely on the force and dexterity of the human hand to control moving parts. Therefore, logical steps to adapt the designs to a low maintenance device for fragrances, pharmaceuticals, pesticides and so on suffer from the disadvantage that an exit route must be mechanically opened or closed to determine whether the contents are dispensed or not and hence require additional control mechanisms that often require more energy than the delivery process itself.

Where some of these differing needs have been addressed for an unsupervised device, only specialised applications with tailored solutions are available, such as collapsible bag inkjet cartridges, which whilst providing a similar long-term store and dispense function, have the inherent disadvantage of requiring a high surface tension, water-based fluid and the availability of much greater pumping forces, whereas one or both of these cannot be relied upon for fragrances, pharmaceuticals, pesticides and so on, particularly, for example, when they are to be sprayed by a low power electrohydrodynamic device.

Other shortcomings are also seen in the prior art when corrosive liquids such as alcohols, aromatic hydrocarbons and oils are to be used, since many incorporate polymers and adhesives that are attacked by such liquids, resulting in poor barrier properties as well as distortion, seal failure and laminar breakdown. Other difficulties arise during manufacture, where it is advantageous to use existing form-fill-seal machine technology, whilst ensuring that the additional dimensional accuracy, sealing precision and unusual inserts can be incorporated at the same time as working with volatile fillings. Also, during manufacture, the prior art which includes integral conduits are typically horizontally filled and sealed and contain an unavoidable amount of air, which is included during the final seal procedure since this must be performed "dry" in order to attain a robust weld of the inner laminates. However, when miniaturising the reservoir, this inclusion of air assumes a greater proportion of the overall volume and can also lead to dispensing problems in response to ambient temperature or pressure changes.

In accordance with a first aspect of this invention, there is provided a sachet having walls of flexible material, joined so as to form an impermeable seal, thereby defining a cavity within the sachet; and a conduit passing through the seal having inner and outer ends, disposed with the inner end within the cavity and the outer end outside the sachet such that the cavity is in fluid communication, via the conduit, with the outside of the sachet, wherein the cavity contains a volume of liquid in use, and the conduit is adapted to prevent the liquid flowing from the cavity without the application of an additional stimulus, irrespective of the orientation of the sachet.

Hence, the invention provides a sachet and a conduit through which fluid can flow from the sachet. However, the conduit prevents the flow of liquid from the cavity without the application of an additional electrical stimulus. Such stimulus may be provided for example by an electrohydrodynamic spraying device of which the conduit forms an electrode.

The additional stimulus is preferably electrical, but it may be mechanical or a combination of electrical and mechanical stimuli.

Typically, the flexible material has a laminated structure. The flexible material may comprise a plastic, a metal or a combination of these.

The walls of the sachet are normally joined by heat sealing.

The seal of the sachet is normally provided around the entire perimeter of the sachet. Preferably, the seal lies substantially in a single plane. This ensures that the seal is as flat as possible which minimises any deformation of the sachet when it is empty, thereby minimising the deflation or restoring force exerted on any liquid within the cavity and aiding good drainage.

The conduit is normally configured to prevent the liquid flowing from the cavity without the application of an additional electrical stimulus by ensuring that the flow impedance of the conduit is sufficient to withstand the combination of the hydrostatic pressure exerted by the fluid and the restoring force exerted by the walls when the volume of fluid in the sachet equals the maximum internal volume of the cavity. This flow impedance is a characteristic of the size, shape and cross-sectional area of the conduit and of the viscosity and surface tension of the liquid stored in the cavity in use.

Typically, the conduit has a constant cross-sectional area. It may comprise a metal, a semi-conductor or a plastic. In the case that it comprises a plastic, the plastic may be electrically conductive.

In one embodiment, the outer end of the conduit is bevelled. This is particularly useful when the sachet is to be used in an electrohydrodynamic spraying device.

In a preferred embodiment, the conduit is rendered rotationally asymmetrical by way of one or more convolutions provided along its length such that, when incorporated into the sachet during manufacture, it can only lie in a predetermined orientation relative to the sachet. This allows a sachet to be manufactured with precise control of the rotational position of the conduit. This is particularly useful if, for example, the conduit has a bevelled outer end since, when the conduit forms the spray electrode in an electrohydrodynamic spraying device, the position of this bevel must be accurately defined with respect to the other electrodes in the device.

Preferably, the sachet further comprises a sealing strip disposed in the seal in the region of the conduit, wherein the sealing strip is thicker than the conduit and the conduit passes through the sealing strip, thereby preventing distortion of the walls around the conduit.

The sealing strip may be applied in the form of a liquid layer, such as a hot melt glue or a molten plastic, or it may be provided in the form of a solid layer.

The sealing strip is preferably provided with a keying feature and the conduit has a corresponding keying feature such that the conduit can engage with the sealing strip in only one orientation, thereby defining the rotation and position of the conduit relative to the sachet. Typically, this keying feature will be a shaped groove in the sealing strip, and the conduit will be shaped in a corresponding way to engage with the shaped groove in only one orientation.

The sealing strip may be provided as a continuous strip, for example from a reel, with the keying feature provided at a defined interval along the length of the strip. Conduits may be fitted into each of the keying features provided along the length to assist in the manufacturing of the sachet.

In one embodiment, the walls have a cover part enveloping the outer end of the conduit, the cover part being provided with a weakened region allowing the cover part to be torn from the sachet, thereby exposing the outer end of the conduit. In this embodiment, the weakened region typically comprises one or more notches provided in the cover part.

In order to provide easy deployment of the sachet as a refill for devices such as electrohydrodynamic spraying devices, the sachet is typically provided housed in a cartridge for an electrostatic or electrohydrodynamic spray device. This cartridge comprises a housing, a sachet according to the first aspect of the invention within the housing and a closure member movable from a sealing position to a dispensing position in response to insertion of the cartridge into a receiving port on the electrostatic spray device.

The cartridge has a mechanical system of which the closure member forms part that cooperates with an actuation device in the electrostatic spray device to move the closure member into the dispensing position when the cartridge is inserted into the receiving port. Typically, the closure member returns to the sealing position if it is subsequently removed from the receiving port.

Typically, the closure member comprises a polymeric compound.

The closure member may be provided in the form of a cap that covers the outer end of the conduit when in the sealing position, or it may be provided in the form of one or more bars that compress a portion of the sachet adjacent the inner end of the conduit when in the sealing position, thereby preventing the liquid from flowing along the conduit.

When the closure member is in the form of one or more arms, it may be mounted on one or more arms that cooperate with an actuating part of the receiving port to splay the arms and thereby move the one or more bars into the dispensing position.

In one embodiment, the one or more bars are an integral part of the housing, which may be formed such that the one or more bars naturally adopt the sealing position. The housing may have a pair of releasing parts that are pushed together by an actuating part of the receiving port so as to move the one bars apart into the dispensing position.

When the closure member is a cap, it is normally mounted at one end of a lever arm which is mounted on a pivot, and the other end of the lever arm cooperates in use with an actuating part of the receiving port so as to rotate the lever arm about the pivot, thereby moving the closure member to the dispensing position.

Alternatively, the cap may be mounted on an arm that is slidable in the direction of the longitudinal axis of the conduit, and the arm may engage with an actuating part of the receiving port so as to slide the arm and closure member into the dispensing position.

Preferably, the closure member is resiliently biased towards the sealing position such that when the cartridge is removed from the receiving port the closure member returns to the sealing position.

The housing may be provided with one or more keying features that engage with corresponding keying features in the sachet, thereby defining the orientation and position of the sachet relative to the housing.

In accordance with a second aspect of the invention, there is provided a method for manufacturing a sachet according to the first aspect of the invention, the method comprising forming an impermeable seal around the perimeter of the sachet except in a first region, filling the sachet with liquid through the first region, compressing a second region of the sachet immediately adjacent the first region so as to force the liquid out of the second region and simultaneously sealing the first region to complete the sachet.

By compressing the second region of the sachet such that the liquid is forced out of the second region and simultaneously forming the seal in the first region, a sachet is formed in which no distortion or webbing is present. Thus, the sachet can be easily and efficiently drained, leaving very little liquid within the sachet after use.

Typically, the impermeable seal is formed by heat sealing.

Typically, the first region is sealed by heat sealing.

In a preferred embodiment, the method is part of a vertical form-fill-seal sachet production process in which two sheets of flexible material are joined along opposing longitudinal edges to form a continuous tube of the flexible material, and the first region of each sachet is formed by a transverse sealing jaw that simultaneously seals the first region of one sachet and part of the impermeable seal of an adjacent upstream sachet.

Typically, the transverse sealing jaw has a heating part that contacts the first region of each sachet to seal that region, and a compression part disposed in a downstream direction from the heating part that compresses the second region of each sachet to simultaneously force the fluid out of the second region.

An object of this invention is to provide a fluid containment and communication system that by a novel departure from existing collapsible bag designs, allows fluids with a broader range of physical and chemical properties to be contained and enables a higher proportion of the contents to be fully dispensed, especially for volumes significantly lower than has yet been feasible. Another object of the invention is to provide a closed reservoir system able to inherently prevent discharge through a conduit open to atmosphere in its "ready" state, whilst also permitting the withdrawal of its fluid with minimal resistance when dispensing is required. In conjunction with these functional developments, the invention also provides for enhanced manufacturability by requiring a minimal number of parts and reducing the number of individual manufacturing processes, thereby making each unit significantly cheaper.

Accordingly, this invention provides a collapsible sachet or reservoir including a conduit that provides the only fluid communication between the reservoir contents and the space outside the reservoir walls, whose geometry and position is such that the force necessary to withdraw more than 90% of the reservoir's contents, even for initial volumes as small as approximately 1 ml, is sufficiently low to allow delivery methods such as electrohydrodynamic spraying and venturi devices to operate effectively without additional pumping. The design and configuration of the walls, seals, sealing strip and other insert(s) are such that creasing of the wall material is minimised so that the bag can collapse efficiently (where efficiency is the "full" enclosed volume divided by the volume remaining when no further liquid can be drawn from the reservoir under a given force). The manufacture of the system also employs special techniques to reduce webbing around sealed areas, which further improves the dispensing efficiency.

Preferably one or more additional sealing mechanisms, such as the cover part, are provided to further ensure the contents remain in the reservoir at times when the system may receive agitation unrelated to its intended use, for example during transit where it might be advantageous to seal the complete system within the walls of the reservoir material or inside a secondary enclosure, so that material must be removed to expose the outer end of the conduit, thus providing a secure seal for pre-use storage and transit, with the added benefit of providing a tamper-evident facility. However, the prior art does not provide for this tear-away facility without exposing a significant portion of the conduit, which, where the conduit's external diameter is of the order of 0.5 mm, risks puncturing skin, a risk that should be especially avoided when the contents may be detrimental to the user in such a dose. Hence the invention provides for access to the tear facility whilst physically preventing harmful contact with the conduit. This is achieved by housing the reservoir within a protective housing, which prevents contact with the conduit after the tear-away facility has been removed. For extended periods and handling between uses, or when, for example, the invention is temporarily swapped for another containing a different fluid, reusable mechanical sealing solutions might be appropriate, such as removable caps, sealed door arrangements or the closure member described above.

Preferably the reservoir walls are made from flexible, laminar materials capable of providing a barrier such that the reservoir's integrity and the quantity and quality of the contents remain within an acceptable tolerance for at least one year, and more preferably two years. In use, the materials will be capable of sustaining corrosive chemicals such as aromatic hydrocarbons, alcohols and oils, and resist temperatures up to approximately 100° C. or more, such as where the contents needs to be sterilised, such as for pharmaceutical use. The internal walls of the reservoir should preferably be such that standard heat-welding of their perimeters can be performed to delimit a sealed pouch and be given to forming a seal around any integral or inserted conduits.

In one embodiment, the invention's collapsible reservoir is provided by a single bag or sachet that having been pre-filled assumes a state such that the elastic collapsing forces of the bag are countered by the surface tension forces associated with the dimensions of the conduit and so that the reservoir's enclosed volume can collapse efficiently when required to do so. However, any configuration that provides additional retention forces, or counters the affect of elastic contraction of the enclosed volume while the reservoir is full and similarly aids extraction or counters the elastic expansion and or the force required to fold the walls as the reservoir is exhausted, will clearly enable larger initial volumes for a given bag surface area. Such configurations might employ weights, springs, levers, diaphragm springs, tilting of reservoir/cartridge and so on so that surface tension forces can resist the net force at the conduit exerted by the fluid pressure resulting from these counter mechanisms.

In another embodiment of this invention, the conduit may consist of a length of hollow cross-section material of which many instances can be cut almost continuously from stock supply during manufacture. Where positional accuracy is required and also to simplify handling for automated manufacture, the invention provides for "keying" of the conduit, whereby, for example, a conduit of circular cross section is modified to reduce its cross-sectional symmetry. This modification may be achieved by attaching items to the conduit or by changing the shape of the conduit itself, for example the convolutions of the conduit described above.

Whilst it is possible to simply seal a straight conduit directly between orwithin the walls of the reservoir, in the correct position and for it to be sufficiently stable and airtight, the preferred embodiment includes a keying of the conduit to aid manufacture by simplifying handling operations and providing a greater surface area for sealing. Also, a shaped conduit can provide greater mechanical support within the seal and thus protect the seal's integrity, should the conduit be subjected to external forces, for example due to the placement and/or removal of a mechanical sealing member at the dispensing end of the conduit. Furthermore, the conduit can be shaped so that as well as offering additional mechanical support to limit movement of the conduit relative to the reservoir walls, it localises any unavoidable movement such that a sufficient portion of the seal length remains unaffected and hence air-tight.

In one embodiment of this invention the conduit may be fitted directly between the inner and outer surfaces of the reservoir walls to form a seal with either this material or material of similar composition which is welded with the inner layer during the sealing process, or with an adhesive suitable to bond the conduit material to the inner layer, so that minimal shape deformation is imposed on the reservoir. However, where sealing necessitates the conduit to be pre-sealed or moulded into a fitment for its integrity and ease of manufacture, the object of the invention remains the same. Another aspect of the invention provides for fitments to be heat-welded without the need for ribs and consequently the complex moulding procedure ribbed fitments require, such as that described in U.S. Pat. No. 6,000,848.

Ideally, the conduit, reservoir and any surrounding structure that may become contaminated in use, are disposed of and replaced as a single unit. This prevents cross contamination between reservoir and conduit and ensures that the system does not suffer premature failure due to one of its parts not being renewed regularly enough. Such a disposable system can be achieved by either including the conduit during manufacture of the filled reservoir, or by sealably inserting it into a pre-filled reservoir through a designated portion of the reservoir wall. The latter would have its positional accuracy and stability provided by a structure separate from the reservoir, such as, for example, a cartridge around the reservoir or part of the device the reservoir is to be dispensed via. Both these arrangements are possible embodiments of the invention as liquid must be retained by surface tension forces prior to use.

The invention provides for the manufacturing processes associated with production capable of controlling the pressure of the liquid in the reservoir, the shape of the walls of the filled reservoir, the elimination of wall distortion or "webbing", particularly around sealed areas and the evacuation of air before the reservoir is sealed closed. This provision is in addition to the invention's suitability to flow production techniques, and provides both improved sealing and the ability to adjust the final liquid pressure in a continuous production process.

A preferred embodiment of the invention will now be described with reference to the accompanying drawings in which:

FIG. 1 shows an example of a liquid dispensing device embodying this invention;

FIGS. 2(a) and 2(b) show schematically a method for sealably including a conduit in a flexible reservoir and likewise, an example of the conduit sealed within the seam of a flexible reservoir;

FIGS. 3(a) and 3(b) show schematically a flexible reservoir with integral conduit containing a volume of liquid where fluid head pressure and reservoir wall collapsing forces are opposed by surface tension forces at the conduit's outermost tip and conversely a flexible reservoir with integral conduit containing a volume of liquid where the dispensing force at the conduit's outermost tip is opposed by any negative head pressure and reservoir wall expanding forces;

FIGS. 4(a) and 4(b) show schematically a method for keying the conduit to simplify automated manufacture and provide additional mechanical support to the conduit;

FIG. 5 shows a possible configuration for delivering a plurality of conduits in a state ready to be sealably included between the walls of the flexible reservoir;

FIGS. 6(a) to 6(d) show some examples of different methods for providing a physical barrier to the flow of the reservoir's contents, which can be repeatedly activated and deactivated;

FIG. 7 shows schematically a flexible reservoir with an integral conduit that is completely encased within walls of the same flexible material;

FIGS. 8(a) to 8(e) show schematically an example of a manufacturing process that provides control over the seal integrity, wall distortion, air exclusion and fill pressures/volumes;

FIGS. 9(a) to 9(c) show schematically some examples of low force fluid delivery applications;

FIGS. 10(a) and 10(b) show an arrangement for automatic actuation of the sealing member of FIG. 6(b);

FIGS. 11(a) and 11(b) show an arrangement for automatic actuation of the sealing member of FIG. 6(c);

FIGS. 12(a) and 12(b) show an arrangement for automatic actuation of the sealing member of FIG. 6(d);

FIG. 13 shows an alternative arrangement for actuation of the sealing members of FIG. 6(d);

FIGS. 14(a) and 14(b) show an alternative sealing arrangement; and

Figure 1:
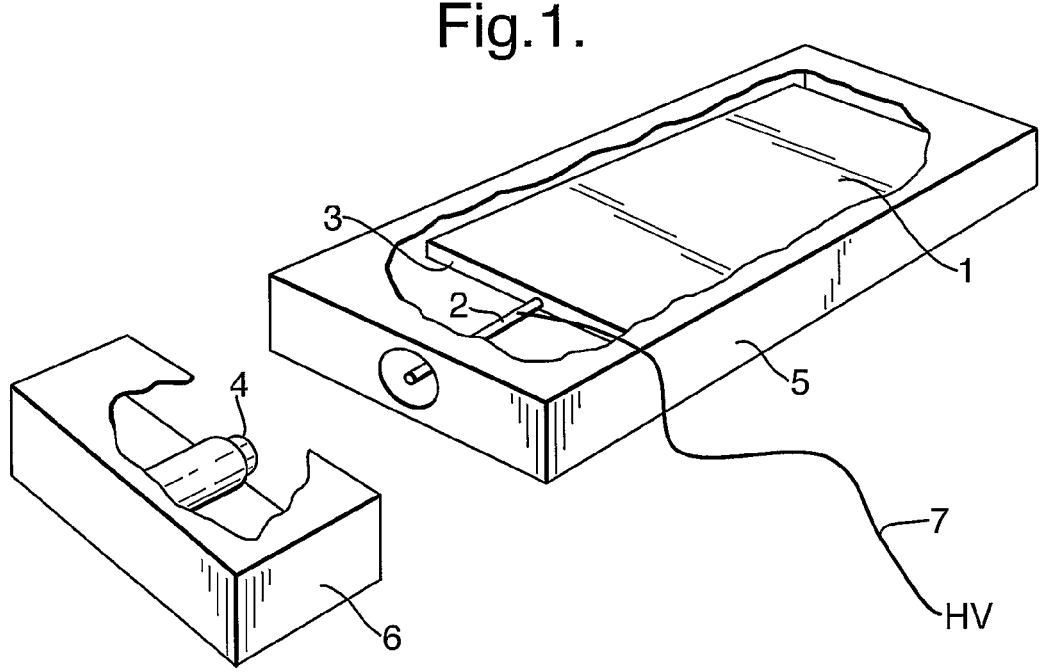

FIG. 1 shows an example of how the present invention might be applied to provide a liquid refill cartridge for a dispensing device such as an electrostatic spray device. In this, there is a flexible sachet or reservoir 1, a conduit 2 in fluid communication with a cavity within the reservoir 1, and a sealing strip 3 provided between opposing walls of reservoir 1 and through which the conduit 2 passes. The conduit 1 in this example comprises a 27-gauge capillary, such as a stainless steel capillary, but could just as easily be of any semi-conductive material including for example modified plastics. The flexible reservoir 1 in this example comprises walls made from a film of polypropylene/aluminium/polyethylene terephthalate (PET) laminates, although there are many other possible materials that can be used on their own or laminated with others in limitless combinations, which may be considered according to the type of fluid to be contained and how it is to be dispensed. A non-exhaustive list of possible materials that may be considered are: polythene, polypropylene, Surlyn®, polyethylene terephthalate (PET), polybutylene terephthalate (PBT), aluminium and other metal foils, many of which are widely available in the flexible packaging industry.

The flexible reservoir 1 and conduit 2 are physically protected by a cartridge housing 5, made from moulded plastic, glass, ceramic or wood, which can either be a separate entity that accepts and locates the flexible reservoir and conduit system or be included integrally during manufacture. A sealing member 4, such as a soft polymer compound, can be repeatedly removed, so as to allow liquid to flow from the reservoir 1 along the conduit 2, and replaced, so as to prevent liquid flowing out of the reservoir 1. Typically the sealing member 4 will be made from silicone rubber. This is particularly suitable since it is immune from attack by many liquids, it is extremely elastic and always returns to its original shape. Other suitable elastomers from which the sealing member 4 may be made include Kalrez, Viton, Neoprene, Hypalon, Acsium, Vertex all made by DuPont and Buna-N.

In this example, a movable end cap 6 which fits on to the end of housing 5 provides a means to support the sealing member and maintain its sealing position when it is applied to the end of the capillary 2.

The housing 5 can further provide location and support for connections to the conduit 2 or reservoir 1, for example to apply motion (such as vibration) or a high voltage connection 7.

Figure 2A:
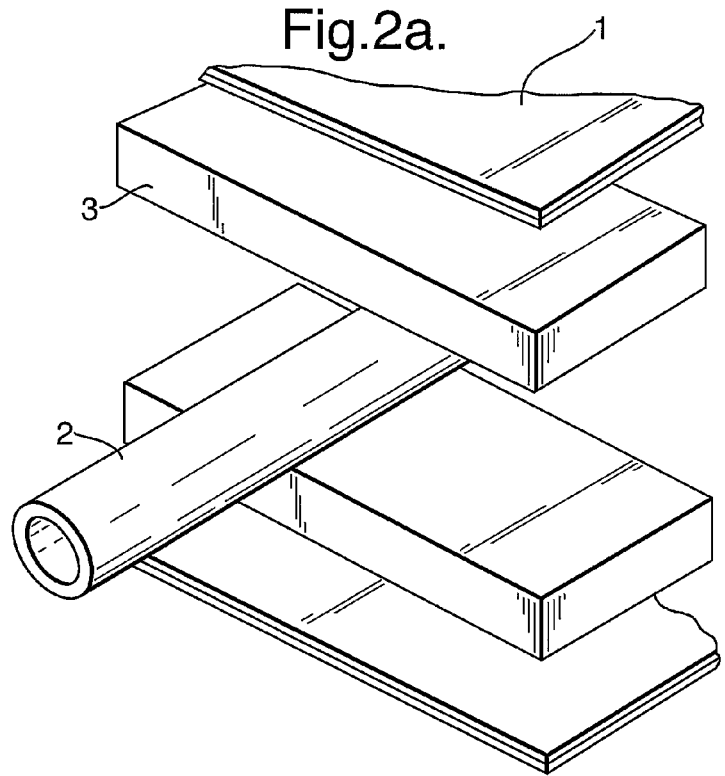

FIG. 2(a) illustrates diagrammatically one possible method for sealably adhering the conduit 2 between the walls of the flexible reservoir 1 such that fluid communication with reservoir 1 is achieved solely via the conduit. Additional material in the form of a sealing strip 3, preferably of the same chemical structure as the innermost laminate of the wall of reservoir 1 or otherwise a material capable of adhering to this laminate, ensures that the walls of the reservoir 1 are only gradually and minimally deformed by the inserted conduit 2. Suitable materials for manufacturing the sealing strip include thermoplastics such as polypropylene, PET, PBT, Surlyn and polythene.

Figure 2B:
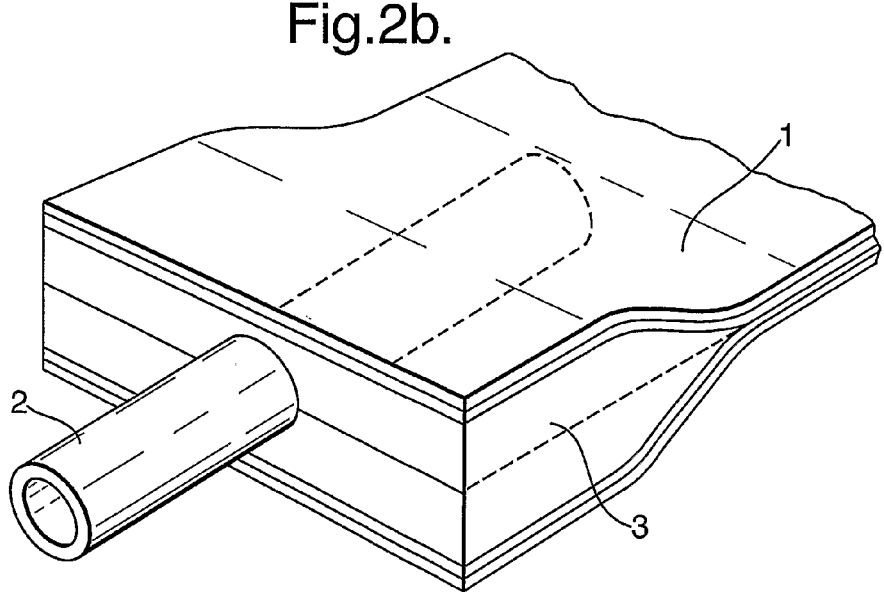

Such additional material can arrive at the conduit/inner laminate interface in a variety of forms, including: as a liquid, either molten or a fluid that solidifies when heated through chemical reaction; in film form, on a reel, either separate from or pre-attached and hence acting as a carrier for the conduit; pre-attached to a part or all of the reservoir wall inner surface; discrete instances pre-applied to the conduit with a seal formed either prior to or during the process of closing the reservoir. When the sealing strip 3 is applied in the form of a liquid, it may comprise a molten plastic or a hot-melt glue such as a polyamide, polyolefin or ethylene vinyl acetate (EVA). Thus, a standard hot-melt glue gun can be used to dispense a line of hot-melt glue along the edges of the walls of reservoir 1, which are then brought together until the glue has solidified. Using a liquid has the advantage that it is possible to create a completely flat end to the reservoir 1 (as shown in FIG. 2(*b*)) since the liquid conforms sufficiently to the shape of conduit 2 by flowing around it with a lower applied force than is the case with solid sealing strips. This helps create lower residual forces.

FIG. 2(*b*) shows the result of the sealing example shown in FIG. 2(*a*) after compression and heating has been applied to weld and seal the materials between the walls of reservoir 1. In this example, the invention provides for minimal thickness of the sealing strip 3, such that once it has accommodated conduit 2 during sealing, the reservoir's cross-sectional variation is restricted substantially to one plane, thus allowing the opposing walls of reservoir 1 to approach and meet each other in as flat a state as possible as the fluid is dispensed, resulting in efficient use of the initial enclosed volume. Where high numbers of refills are to be produced, the ability to simplify and economise manufacturing techniques becomes a huge commercial advantage. Accordingly, the techniques and processes afforded by the design of the conduit 2 and careful control of dimensions, especially thickness, represents a significant improvement over all other fitment related flexible packaging designs.

Figure 3A:
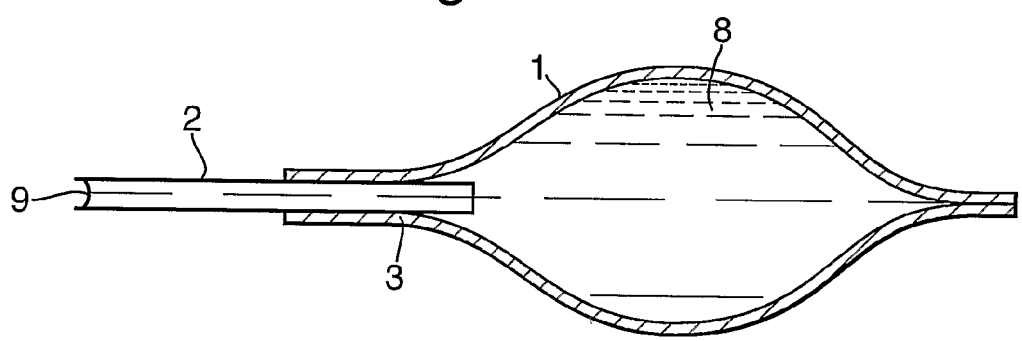
Figure 3B:
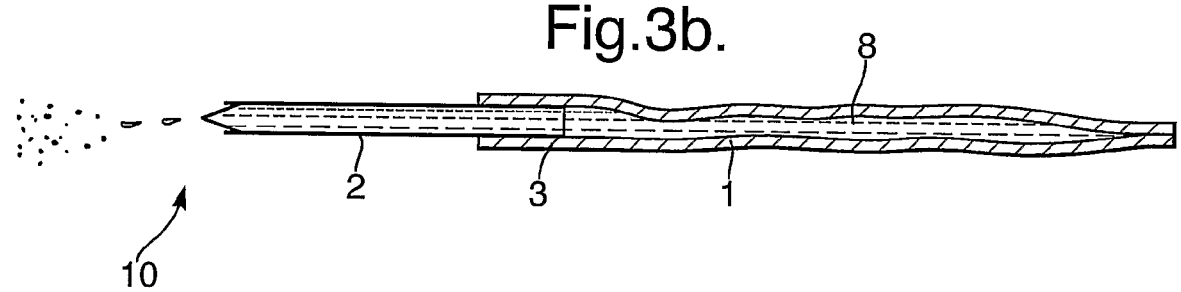

FIG. 3(*a*) schematically illustrates an example of the invention in its ready state, with the reservoir 1 containing its maximum capacity (as defined by the requirements of the invention) of fluid 8. Said fluid 8 fills the conduit 2 under capillary action until its surface 9 reaches the outermost end of conduit 2, where the change in diameter of conduit 2 causes surface tension forces to hold the surface of the fluid at this location. This surface tension force also counters the pressure forces acting to dispense fluid from the reservoir, which are unavoidably caused by the head of fluid above the outermost end of the conduit 2 and tendency of the flexible walls of reservoir 1 to try to resume a flat state.

In this embodiment, the reservoir 1 is manufactured, as already mentioned, so that the flow impedance along conduit 2 prevents liquid from passing along conduit 2 without the presence of an additional stimulus, for example squeezing the reservoir 1, pumping the liquid along the conduit 2 or breaking down the meniscus at surface 9 by way of an electrostatic spraying process. The flow impedance depends on the viscosity of the liquid and the surface tension at the outermost end of the conduit 2, which is dependent on the size and shape of the conduit 2.

In addition, the walls of reservoir 1 are thin in cross-section. For-example, although walls with cross-sections of 250 µm may be used, it is preferable to use cross-sections of less than 100 µm, for instance 50 µm. The walls thus have a low flexural modulus (i.e. they are not stiff or rigid), and are sealed so that no webbing or creasing of the walls occurs. This is achieved by the sealing process described later and by provision of sealing strip 3. The walls of the reservoir 1 may therefore easily collapse in to a flat state as shown in FIG. 3(*b*). Furthermore, since they have a low flexural modulus and the residual forces are low (due to lack of webbing) the restoring force exerted by the walls of reservoir 1 on the liquid within it is low. This restoring force is the force that causes the walls of reservoir 1 to try to assume a flat state. Prior art systems inevitably use more rigid materials for purposes of surface printing, glossy appearance, support of the reservoir so that it may stand up and burst strength. Our system may use much thinner materials without danger of damage to the reservoir 1 since this is protected by housing 5, which reduces any shock being transmitted to vulnerable areas of reservoir 1.

The seal between the two opposing walls of reservoir 1 lies substantially in one plane. This differs from the prior art reservoirs which generally have bulky seal lines causing major deformation of the reservoir and inducing residual forces into the reservoir impeding efficient drainage.

The design of the walls of reservoir 1 allow the reservoir to be used in any orientation. When in a horizontal orientation (as shown in FIGS. 3(*a*) and 3(*b*)), the maximum head of pressure above the conduit 2 is simply half the height of the reservoir 1 at its highest point when it contains its maximum internal volume of liquid. When in a vertical orientation with the conduit 2 exiting halfway up one side, the bag still collapses uniformly since as the contents are removed, liquid is removed equally from the part of the reservoir 1 above the conduit 2 and the part of the reservoir 1 below the conduit 2. This allows the reservoir 1 to be drained in a vertical configuration without manual assistance or additional pumping.

Collapsible reservoirs in the prior art stipulate additional conditions or systems to counter the tendency of the liquid to exit the reservoir through the open conduit, such as: the requirement that drink pouches must be oriented with the outer tip of the straw uppermost (negative head of pressure at all times); the reduction of internal pressure by forcibly enlarging the enclosed volume employed in ink cartridge bags; the requirement of an additional barrier at the end of the conduit at all times when dispensing is not required such as the valve on wine boxes containing a collapsible bag. All of these solutions either increase the force required to withdraw the fluid when desired or increase the complexity and energy requirements of the dispensing device in providing valves or other moving parts. With these existing restrictions on economical and high volume manufacture, which are particularly limiting for applications such as the storage and dispensing of aromatic oils, agricultural chemicals, pharmaceutical products and pest control or pesticide products, the present invention offers an important commercial advantage by facilitating ranges of previously unfeasible products.

FIG. 3(*b*) schematically illustrates an example of the invention in its "empty" condition, with the reservoir 1 containing its minimum capacity of fluid 8. In approaching its "empty" condition, the flow of liquid 10 out of the conduit 2 means that surface 9 (shown in FIG. 3(*a*)) is no longer present, so that surface tension forces are no longer acting against the movement of fluid, but the reduced head of fluid pressure and the increasing resistance to deformation caused by the walls of reservoir 1 eventually act to counter the dispensing force. With existing collapsible bag type reservoirs, these uncontrolled resistive forces are greater and increase significantly for the final 5 ml to 10 ml of fluid, so that the dispensing forces must be likewise increased or the remaining fluid discarded with the reservoir, which will obviously particularly limit the use of small initial volumes and costly fluids. For many fluid refills, for example aromatic, pharmaceutical and pest control or pesticide products, the "full" refill volumes and relative cost of the fluids mean that such waste is not economically viable or at best uncompetitive. The present invention addresses this problem through its shape, configuration of materials and manufacturing processes, so that less than 0.2 ml is left in the reservoir at the end of the refill's usable life, permitting much smaller start volumes and hence more convenient and competitively priced refills.

Figure 4A:
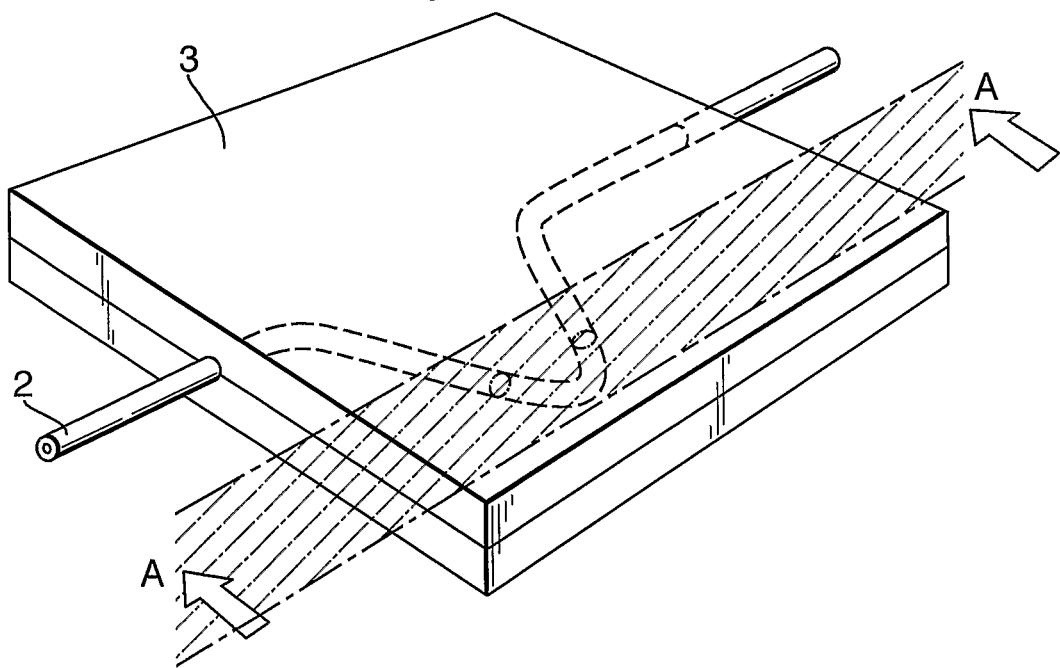

FIG. 4(a) shows schematically an example of the way in which the conduit 2 might be keyed in order to simplify automated manufacture and provide additional mechanical support to the conduit. Due to the dimensions of the conduit 2, as prescribed by other aspects of the invention in providing surface tension fluid retention and efficient use of small refill volume, precision manufacture is required to handle and position these parts. Some dispensing devices that the refill might be used for, such as those that employ electrostatic spraying, will also demand narrow positional (<1 mm) and even rotational tolerances of the conduit. In one embodiment, the present invention provides for these requirements by shaping the capillary during its individual manufacture so that its position and rotational orientation can more easily be identified and controlled, thus permitting simpler and hence more robust, resource efficient and economical manufacture. In the example, this shaping is achieved by convoluting or bending the conduit such that rotational symmetry is eliminated in all planes and so that it assumes a defined rotational position when placed against at least one surface of predetermined contour, for example flat or curved. Bending of the conduit to achieve these objectives may be preferred as it represents a standard manufacturing process, which requires no additional parts or fixation methods, however there are many other methods that achieve the same result at least as effectively, which will be obvious to persons skilled in the art. Where manufacturing capability allows or where rotational accuracy is not important, keying may be avoided altogether.

Figure 4B:
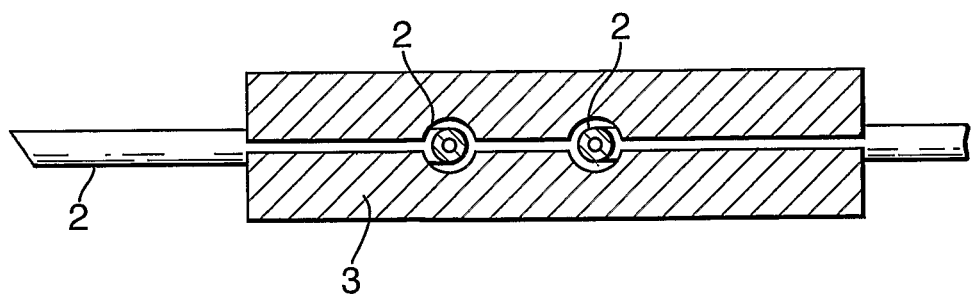

FIG. 4(b) shows a sectional view of FIG. 4(a) to illustrate the additional mechanical support provided by a keyed conduit. In this example embodiment, the invention provides for the conduit's position with respect to the sealing strip 3 rotationally and in all three planes to be physically held by the interlocking shape of the moulded sealing strip 3 and the shaped conduit 2, without the need for an adhesive bond between the two parts. Such an arrangement permits greater forces to be applied to the conduit 2 (for a given seal strength), which is beneficial, for example, when the conduit's outermost end is subjected to repeated application and removal of sealing member 4. Furthermore, our research has shown that the shaping of the conduit can act to localise micro-motion within the seal so that a portion of the seal remains intact, even under aggressive movement at the outermost end of the conduit, thus enabling a more robust refill to be manufactured for a similar cost and hence offering substantial commercial advantages. Another aspect of the invention provides for the position and support of the reservoir 1 and conduit 2 when it is physically protected by housing 5 to be defined using the shape of the conduit 2 and/or those portions of the wall of reservoir 1 stiffened by the heat sealing process. For example, shaped portions of the housing 5 can interlock with the conduit or align with/insert through corresponding shapes cut from the reservoir wall material. This allows the initial and ongoing positional accuracy to be inherent to the design without additional complexity or precision being required from the assembly equipment.

FIG. 5 shows a possible configuration for delivering a plurality of conduits 2, where they are attached to a continuous length of the sealing strip 3 in a state ready to be included between the walls of the flexible reservoir. This configuration, which enables smoother, less complicated and faster manufacture, is made possible by the invention's efficiency of design. The form in which the conduits 2 arrive is designed to be as similar as possible to that of the flexible walls of the reservoir, such that similar manufacturing processes may be employed, and further allowing manufacturing processes to be carried out simultaneously. In other embodiments of the invention, for example where the conduit 2 is held by a fitment between the walls of the reservoir 1, existing product sort and feed equipment may be employed to deliver and position these during manufacture, as will be obvious to those skilled in the art. Another aspect of the invention provides for a range of different manufacturing techniques and sequences, so that the conduit 2 may arrive singularly or in a strip of either continuous lengths of material or temporarily conjoined fitments.

FIGS. 6(a) to 6(d) show some examples of different methods for providing physical barriers to the flow of the reservoir contents that can be repeatedly activated and deactivated. Where the outermost end of the conduit is used in close proximity to the point of dispensing, space for conventional valves is limited. Furthermore, a sealed coupling to such a valve would still be unavoidably required. The sub-atmospheric pressure systems employed in some collapsible bag inkjet refills, are unsuitable in many other applications. For example, where the conduit will allow air to be drawn into the reservoir 1 under such a condition, the presence of this air can subsequently lead to pressure changes within the reservoir 1 in response to ambient temperature change and can also result in air bubbles, which can block the fluid's path to the innermost end of the conduit 2. Accordingly, the invention provides for a reusable sealing element in keeping with the disposable nature of the product, by placing the sealing member 4 on the outermost end of the conduit 2, which prevents fluid flow out of the reservoir 1 and air flow into the reservoir 1.

Figure 6A:
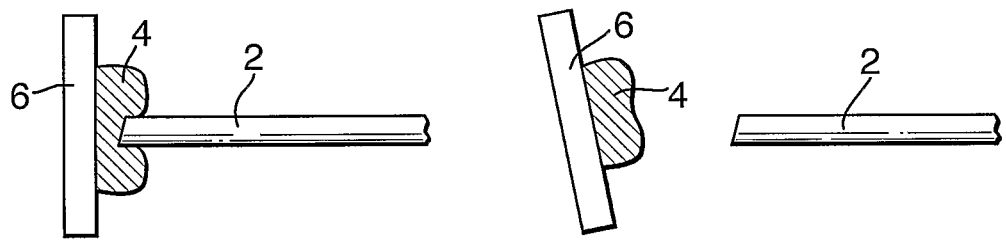
Figure 6B:
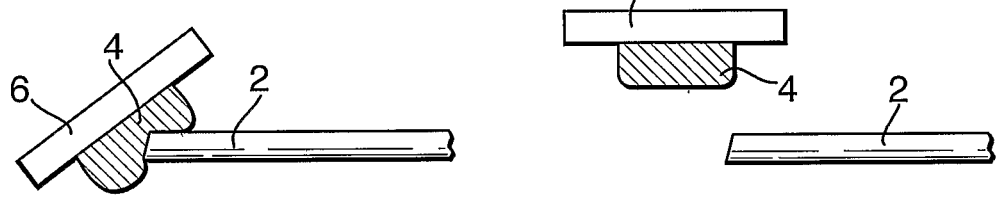
Figure 6C:
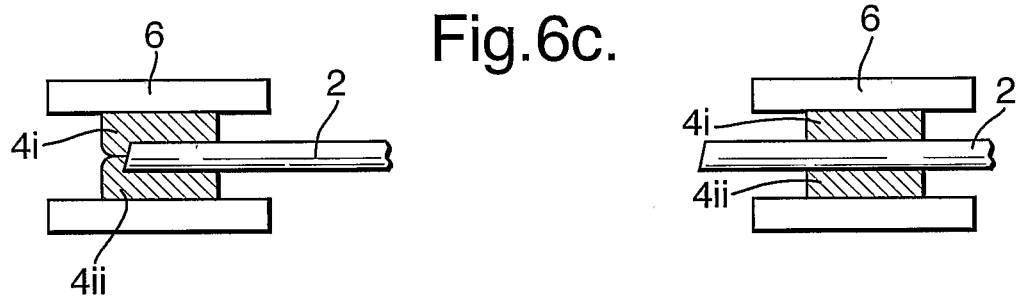
Figure 6D:
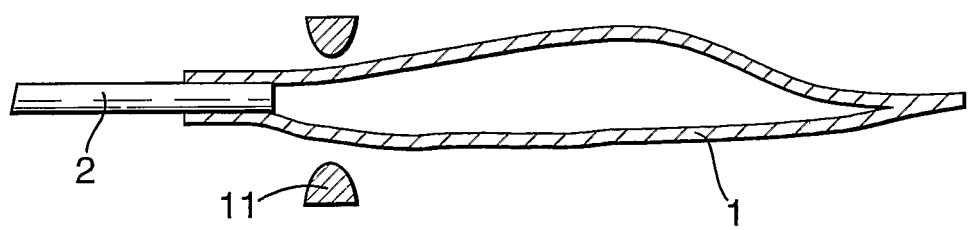

FIGS. 6(a) to 6(c) show examples of different ways that the sealing member 4 can be applied and removed from the conduit 2, where FIG. 6(a) shows how a removable cap 6 housing the sealing member 4 such as shown in FIG. 1 may be withdrawing from the housing 5. FIG. 6(b) shows a rotational movement and FIG. 6(c) a sliding movement. There are many other embodiments and combinations of these that will be obvious to those skilled in the art. FIG. 6(d) illustrates another method for preventing flow out of the reservoir, whereby the walls of the flexible reservoir are temporarily sealably pinched together at a location close to the innermost end of the conduit 2 by movable surfaces 11. The movable surfaces 11 may be made of similar materials to sealing member 4.

Various mechanisms for moving the sealing member from a sealing position to a dispensing position automatically on insertion of the housing 5 into a receiving port on an electrostatic spraying or other device will now be described. FIG. 10(a) shows an arrangement that may be used with the type of sealing member shown in FIG. 6(b). The sealing member 4 is in the sealing position over the outermost end of conduit 2. It is mounted at one end of a lever arm 102, which pivots about point 103. A spring 104 biases the lever arm 102 and closure member 4 towards the sealing position. When the housing 5 is inserted into the receiving port 100 as shown in FIG. 10(b), an actuating member 101 pushes the lever arm 102 so that it rotates about point 103, thereby moving sealing member 4 to the dispensing position in which liquid can flow from the conduit 2. Subsequent withdrawal of the housing 5 from the receiving port 100 causes the spring 104 to rotate the lever arm 102 and sealing member 4 back to the sealing position, thereby preventing liquid flowing from the conduit 2.

Figure 11A:
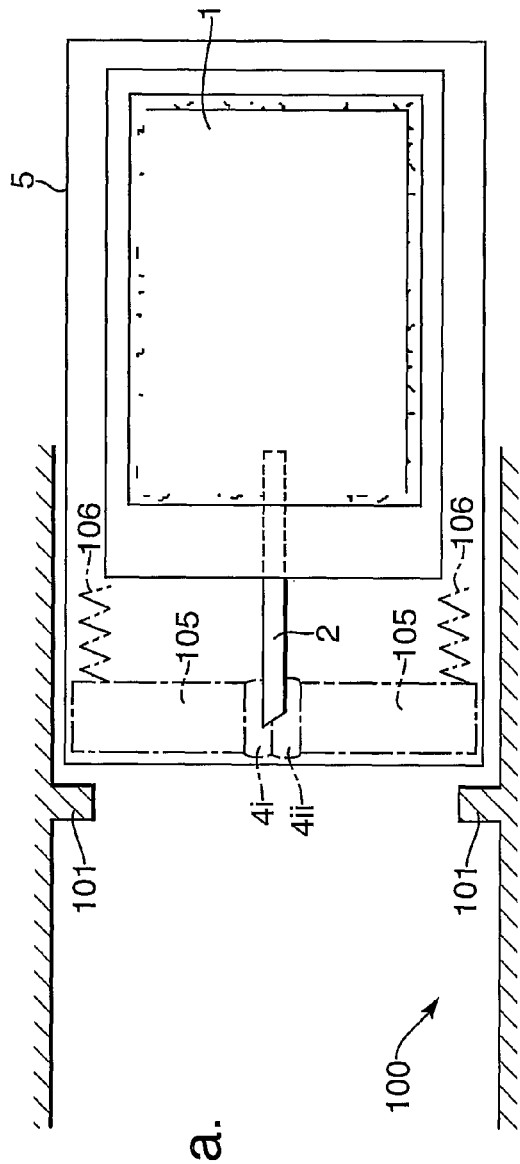
Figure 11B:
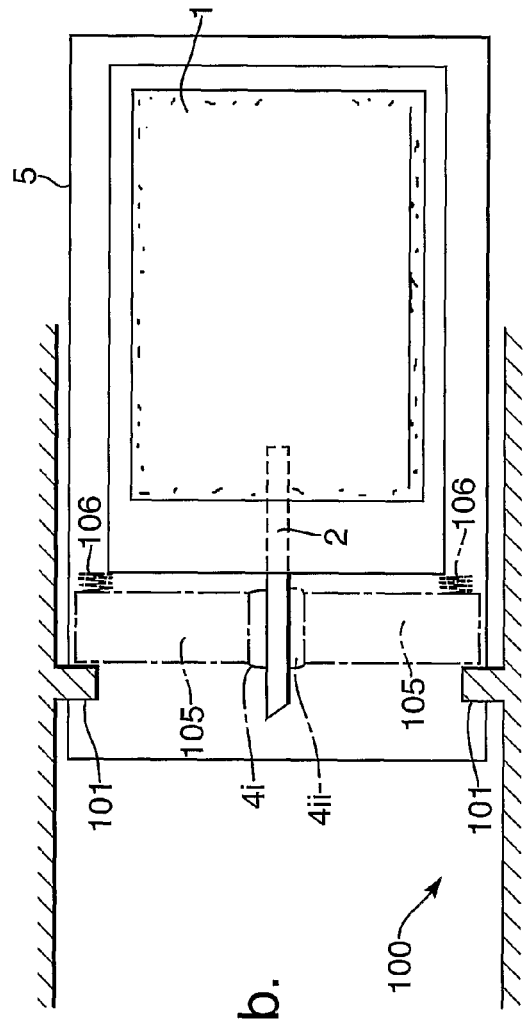

FIG. 11(a) shows an arrangement that may be used with the type of sealing members 4i and 4ii shown in FIG. 6(c). The sealing members 4i and 4ii are in the sealing position over the outermost end of conduit 2. They are mounted at the inner ends of respective arms 105, which may slide in the direction of the longitudinal axis of conduit 2. A pair of springs 106 biases the arms 105 and closure members 4i and 4ii towards the sealing position. When the housing 5 is inserted into the receiving port 100 as shown in FIG. 11(b), a pair of actuating members 101 pushes the arms 105 so that they slide in the direction of the longitudinal axis of the conduit 2 towards the reservoir 1, thereby moving sealing members 4i and 4ii to the dispensing position in which liquid can flow from the conduit 2. Subsequent withdrawal of the housing 5 from the receiving port 100 causes the springs 106 to push the arms 105 and sealing members 4i and 4ii back to the sealing position, thereby preventing liquid flowing from the conduit 2.

Figure 12B:
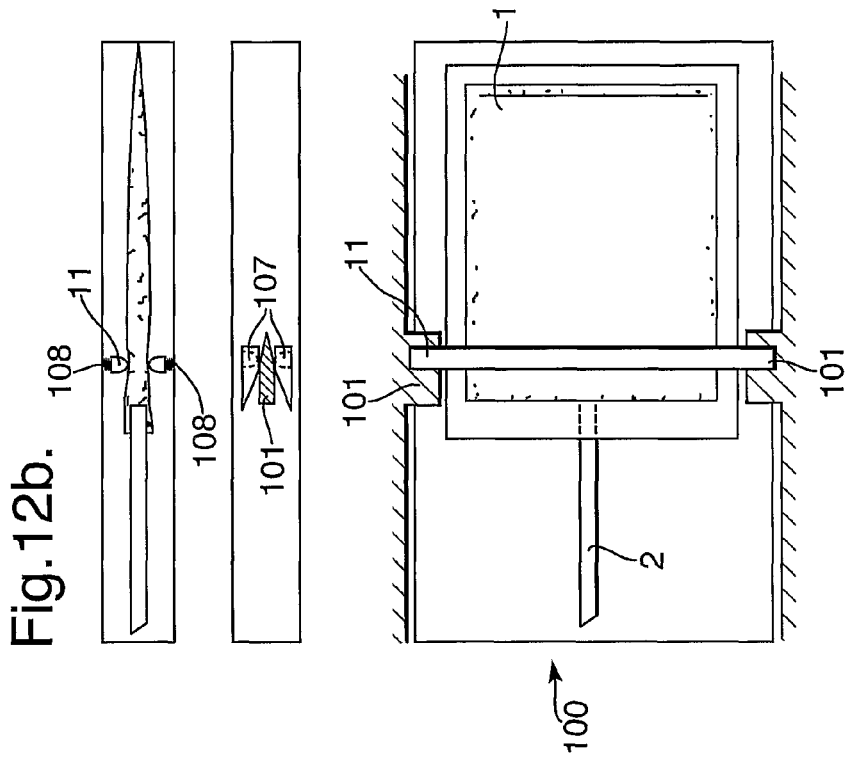
Figure 12A:
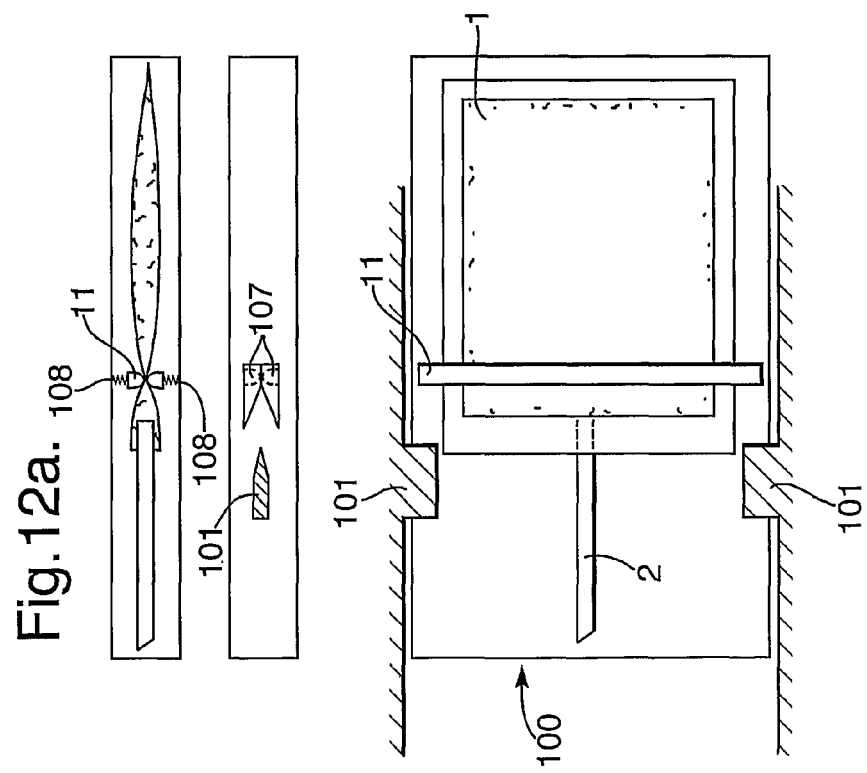

FIG. 12(a) shows an arrangement that may be used with the type of sealing members or movable surfaces 11 shown in FIG. 6(d). In this the movable surfaces are urged into the sealing position in which they pinch the walls of reservoir 1 together in a region adjacent the innermost end of conduit 2 by springs 108. Insertion of the housing 5 into the receiving port 100 causes the wedge-shaped actuating members 101 to splay the arms 107 on which the movable surfaces 11 are mounted. This is shown in FIG. 12(b) in which the movable surfaces 11 are in the dispensing position. Subsequent removal of the housing 5 from the receiving port 100 causes springs 108 to force the movable surface back to the sealing position.

Figure 13:
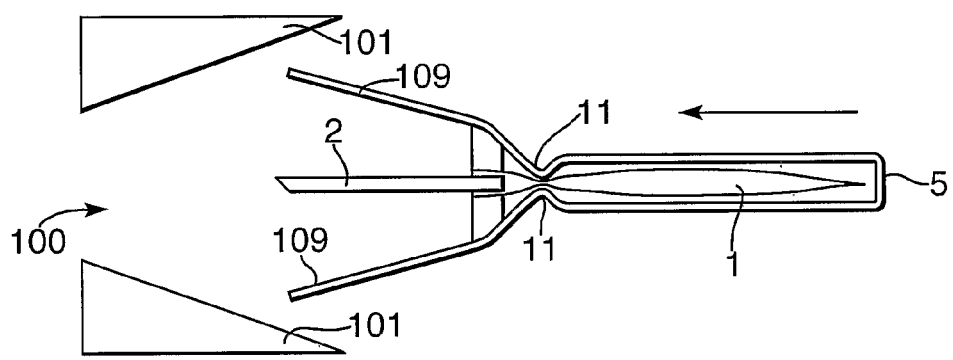

FIG. 13 shows another arrangement that may be used with the type of sealing members shown in FIG. 6(d). In this the movable surfaces 11 are integrally injection moulded with the housing 5. This moulded housing 5 is resilient and naturally returns to the shape shown in FIG. 13 so that when removed from the receiving port 100, the movable surfaces will be in the sealing position shown. However, when the housing 5 is pushed in the direction of the arrow into the receiving port 100, the actuating members 101 push the ends 109 of the housing together, thereby pulling the movable surfaces apart into the dispensing position so that they allow fluid to flow into the conduit 2.

FIGS. 14(a) and 14(b) show an alternative arrangement for use with the type of sealing member 4 shown in FIG. 6(a). In this, a chain link mechanism formed from links 110a, 110b and 110c hinged together by hinges 111a, 111b, 111c and 111d can move between the sealing position shown in FIG. 14(a) and the dispensing position shown in FIG. 14(b). This configuration ensures that motion between the sealing member 4 and the conduit 2 is largely axial and keeps the sealing member 4 well away from the spray area without taking up too much vertical space. The chain links 110a, 110b and 110c and hinges can be moulded as a single piece from polypropylene or a similar material with the hinges 111a, 111b, 111c and 111d being natural hinges in the moulding. Although not shown the actuating member in the receiving port engages the chain link 110b in the region of the sealing member 4 on insertion of the housing 5 into the receiving port 100 and moves it to the dispensing position shown in FIG. 14(b). Subsequent removal of the housing 5 from the receiving port causes the actuating member to move the chain link mechanism and sealing member 4 back to the sealing position before disengaging with the chain link 110b.

Figure 7:
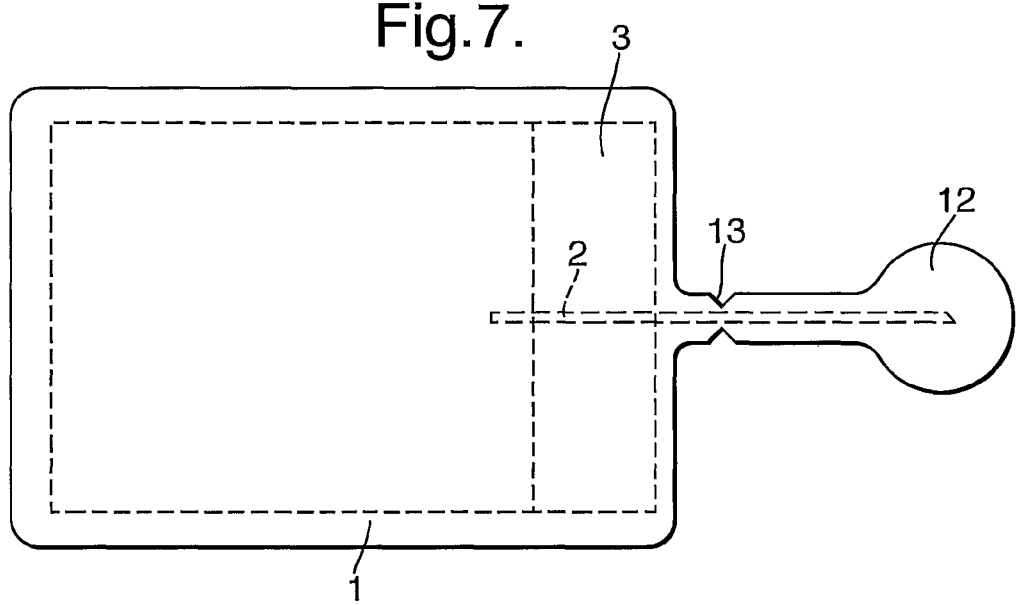

FIG. 7 shows schematically a flexible reservoir with an integral conduit 2 that is completely encased within walls of the same flexible material 1. A cover or enclosure 12 provides a robust seal to the end of the conduit, so that the contents are further protected in storage and transit before the refill's first use in a dispensing device. The enclosure 12 has no fluid communication with the reservoir 1, other than via the conduit 2, and preferably is of minimal volume. The shape of the flexible wall material at point 13, where notches are provided in the enclosure 12, acts to concentrate stress to this area when a pulling force is applied to the material of the enclosure 12, causing a tear to start at point 13 and migrate substantially laterally with respect to the conduit to the other edge of the wall material such that much of the wall portion defining the enclosure 12 is removed to expose the outermost end of the conduit 2. The shape and size of the enclosure 12, which direct and localise the force required to tear the material, provides for this procedure to take place whilst the outermost end of the conduit 2 can remain at all times inaccessible to fingertips. This is because the reservoir is normally housed in a housing 5, which prevents access to the conduit 2 by the user's fingertips after the enclosure 12 has been removed. The housing allows access only to the end of the enclosure 12 so that this may be removed to expose the outermost end of the conduit 2 so that liquid may flow through it.

Even though the enclosure 12 and the cavity within reservoir 1 are in fluid communication via conduit 2, in practice only a very small amount of liquid can leak into enclosure 12 since only a very small gap exists in enclosure 12 down the sides of conduit 2. This leakage would most likely remain in enclosure 12 when it is removed or coat the outside of conduit 2.

Figure 8A:
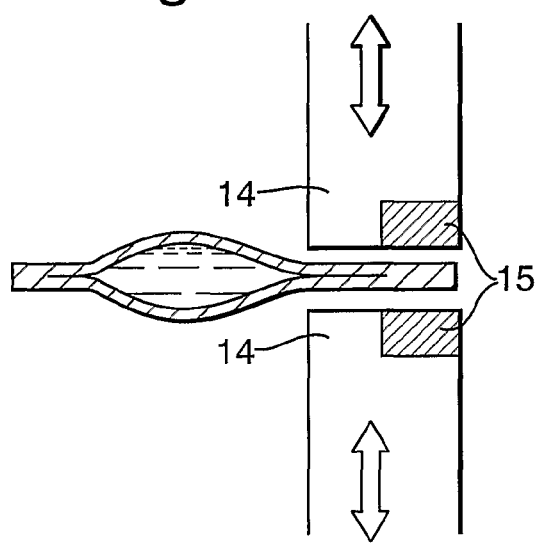
Figure 8B:
Figure 8C:
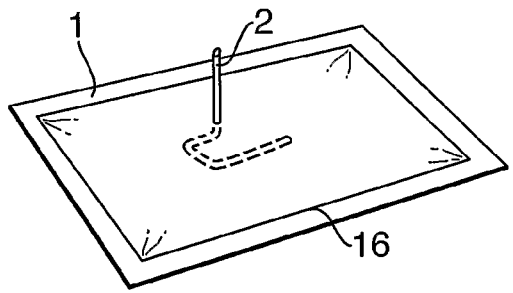
Figure 8D:
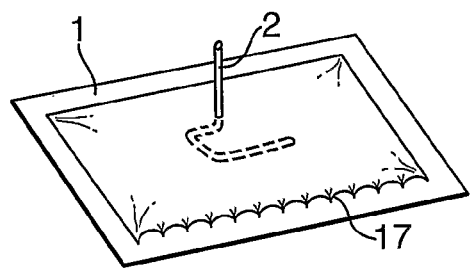

FIG. 8(a) shows schematically an example of a manufacturing process that prevents webbing of the wall material in the vicinity of the seal, whereby an area larger than the seal is first compressed by surfaces 14, thus flattening the wall material and expelling fluid from the seal area. Once this has occurred, the sealing equipment, in position 15, is activated before surfaces 14 are retracted and the reservoir assumes the general shape shown in FIG. 8(b), with seals having equal integrity and minimal wall distortion as shown on seal line 16 in FIG. 8(c) rather than the webbing shown on the final seal line 17 in FIG. 8(d).

Figure 8E:
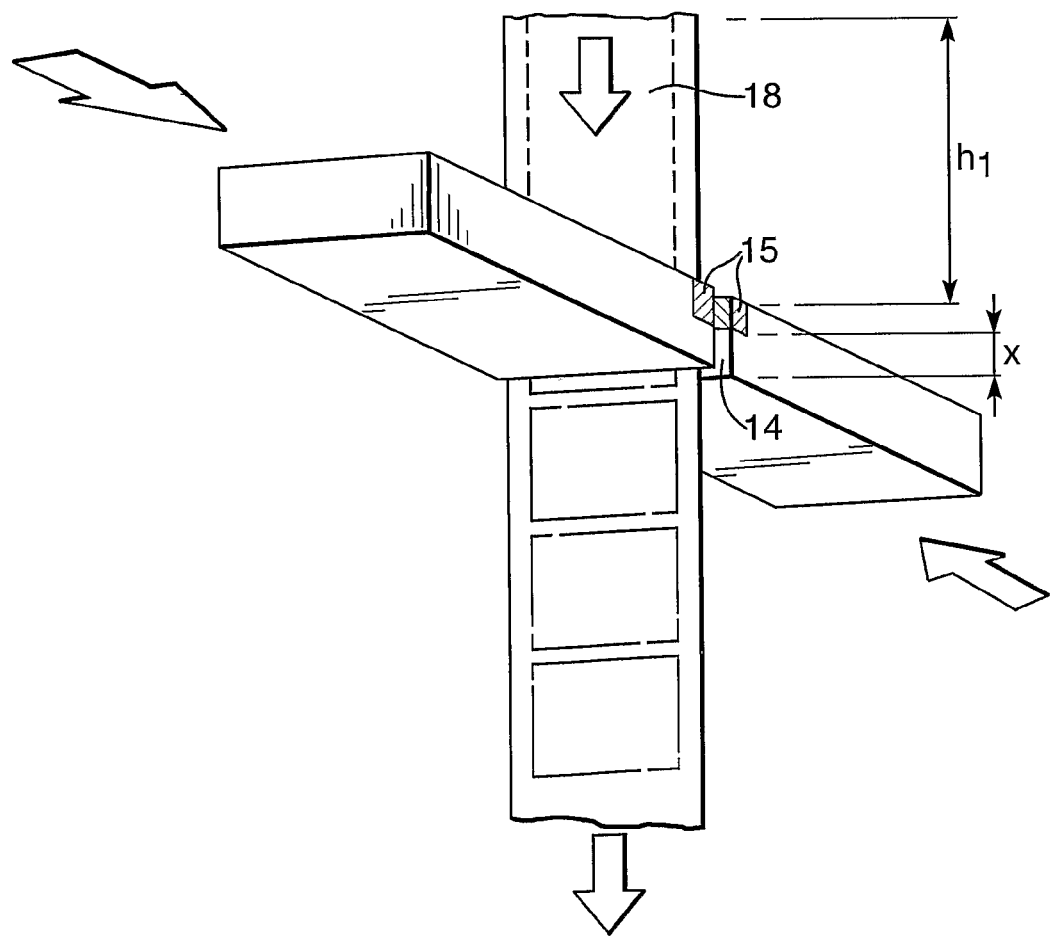

FIG. 8(e) shows an example of how this manufacturing process can be oriented in order to control the fill volume and pressure within the reservoir before it is sealed. In this vertical form-fill-seal process, the reservoir wall material is formed into a tube 18 by joining two sheets of flexible material suitable for making reservoirwalls along opposing longitudinal edges. The tube 18 is oriented such that liquid migrates to one end, for example under gravity. The compressing and sealing machinery then acts to delimit pouches in the tube 18 by sealing at defined intervals along the tube, with the top seal of one pouch being formed simultaneously and in juxtaposition with the bottom seal of the adjacent upstream pouch. After each transverse top/bottom seal has been formed the tube 18 is pulled through the machinery by the defined interval. The fluid pressure and fill volume can be controlled by adjusting the head of supply fluid, "h1" and adjusting the area of the pouch compressed by surfaces 14, "x". The provision of such adjustment permits the desired pressures and fill volumes to be obtained, after which they can be set to give the same results repetitively, enabling flow production.

Figure 9A:
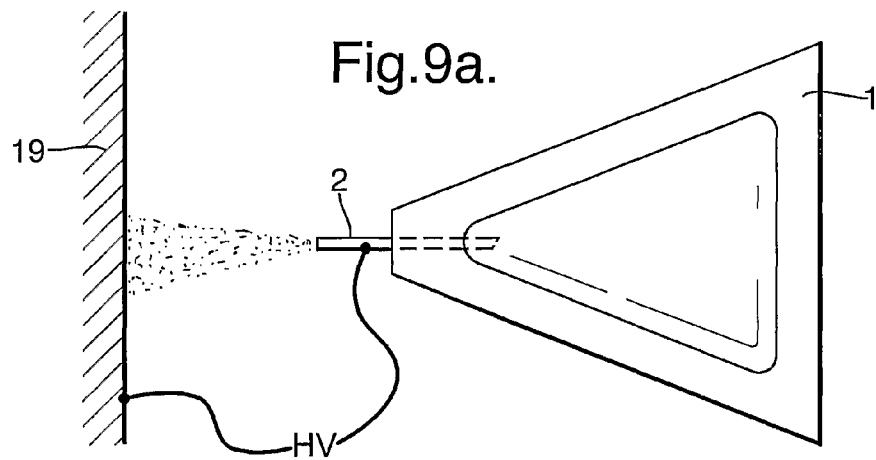
Figure 9B:
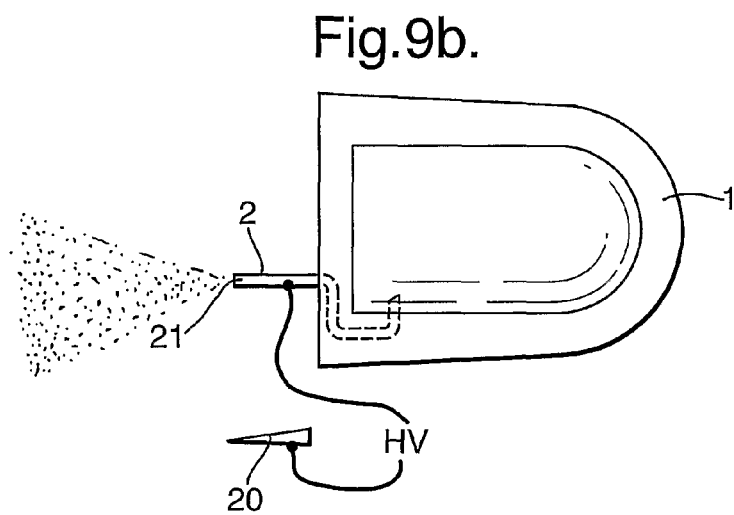
Figure 9C:
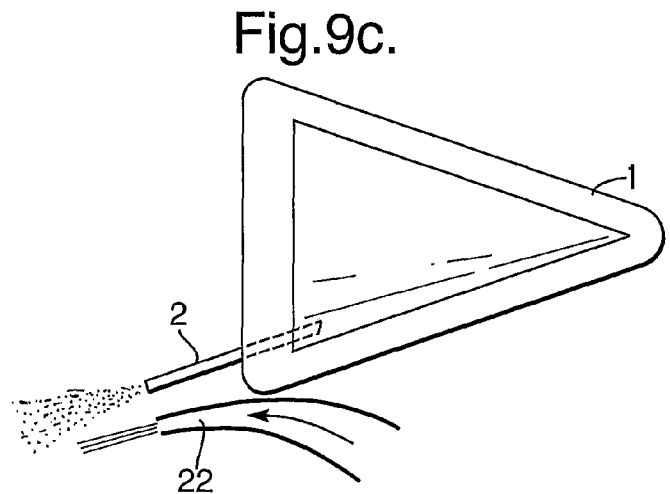

FIGS. 9(a) to 9(c) show schematically some examples of low force fluid delivery applications, where FIG. 9(a) shows fluid from the reservoir being electrostatically sprayed onto a surface 19 and FIG. 9(b) shows fluid being electrostatically sprayed and discharged by a sharp electrode 20, so that it remains substantially in the air before evaporation occurs. FIG. 9(*b*) is also an example of where the rotational accuracy of the conduit is important, since the bevel 21 must be precisely orientated with respect to the discharging electrode 20. FIG. 9(*c*) shows an example of another application, where an airjet 22 passing across the end of the conduit, draws fluid from the reservoir, the lower resistive forces permitting lower air velocity, pressure or flow rate to be possible.

Figure 15:
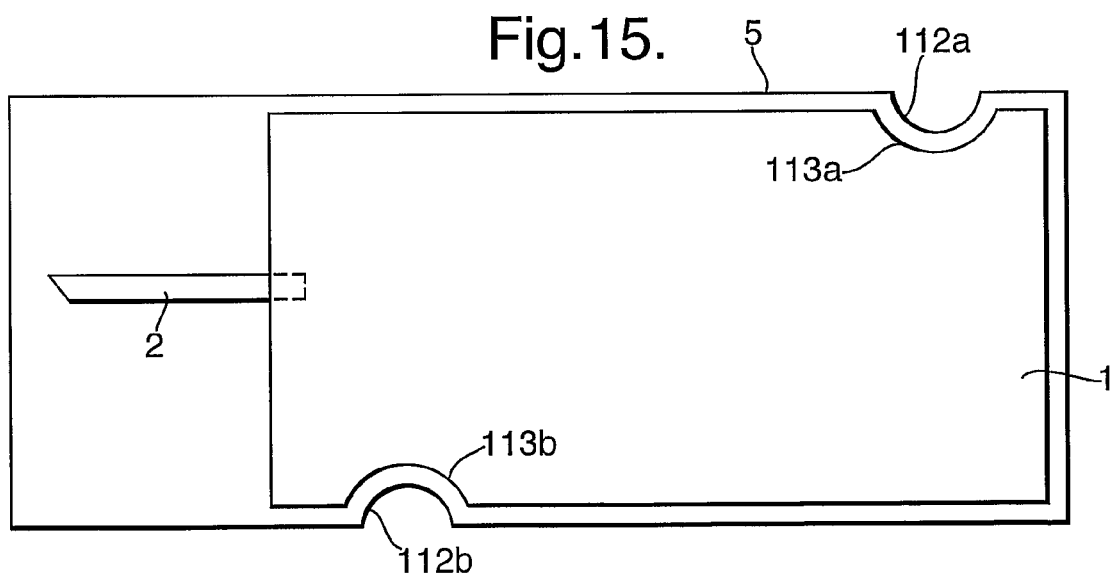
FIG. 15 shows a keying arrangement in the housing to locate the reservoir.
Figure 16:
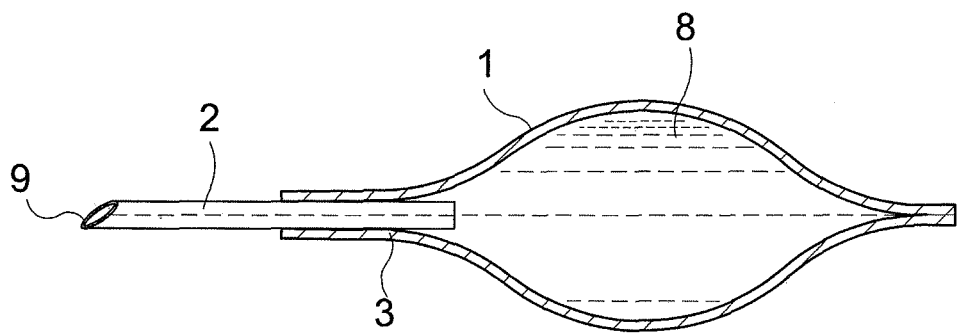
FIG. 16 shows the capillary cut to produce a diameter on the outer end of the capillary that is wider than the diameter on the interior end.

FIG. 15 shows a technique for ensuring that the reservoir 1 lies in a predefined orientation with respect to the housing 5. The housing 5 has a pair of keying features or notches 112*a* and 112*b*. The reservoir 1 is cut and sealed so that it has a corresponding pair of notches 113*a* and 113*b*. Thus, the reservoir 1 may only be fitted into the housing in a predefined orientation as shown. This can be especially useful when the conduit 2 must lie in a specific direction when the housing has been inserted into an electrostatic spray device. As has been described above, the invention allows the conduit 2 to be keyed with the sealing strip 3 such that it always lies in the correct orientation with respect to the reservoir 1. The technique of FIG. 15 then ensures that the reservoir 1 and hence the conduit 2 lie in the correct orientation and position relative to the housing 5. The housing may similarly be provided with a key that corresponds to a key on the electrostatic spray or other device to which it is to be fitted so that it can only be inserted into that device in one orientation.

Other embodiments and variations will be apparent to those skilled in the art.

The invention claimed is:

1. A cartridge for an eletrostatic spray device comprising a sachet, said sachet having walls of flexible material, joined so as to form an impermeable seal, thereby defining a cavity within the sachet; and a conduit passing through the seal having inner and outer ends, disposed with the inner end within the cavity and the outer end outside the sachet such that the cavity is in continuous fluid communication, via the conduit, with the outside of the sachet, wherein the cavity contains a volume of liquid in use, and the conduit diameter is sized from the inner end to the outer end of the capillary so as to prevent the liquid when the device is in its ready state from flowing from the cavity as a result of surface tension without the application of an additional stimulus, irrespective of the orientation of the sachet wherein the flow impedance of the conduit is sufficient to withstand the combination of the hydrostatic pressure exerted by the fluid and the restoring force exerted by the walls of the cavity when the volume of fluid in the sachet equals the maximum internal volume of the cavity.

2. The cartridge according to claim 1, wherein the flexible material is a laminated structure adapted so as to have a restoring force exerted by the walls that impedes liquid flow.

3. The cartridge according to claim 1, wherein the flexible material comprises a plastic.

4. The cartridge according to claim 1, wherein the flexible material comprises a metal.

5. The cartridge according to claim 1, wherein a heat seal attaches a wall to its adjacent wall.

6. The cartridge according to claim 1, wherein the seal lies substantially in a single plane.

7. The cartridge according to claim 1, wherein the conduit has a constant cross-sectional area.

8. The cartridge according to claim 1, wherein the conduit comprises a metal.

9. The cartridge according to claim 1, wherein the conduit comprises a semi-conductor.

10. The cartridge according to claim 1, wherein the conduit comprises a plastic.

11. The cartridge according to claim 10, wherein the plastic is electrically conductive.

12. The cartridge according to claim 1, wherein the outer end of the conduit is bevelled.

13. The cartridge according to claim 1, wherein the conduit is rendered rotationally asymmetrical by way of one or more convolutions provided along its length such that, when incorporated into the sachet during manufacture, it can only lie in a predetermined orientation relative to the sachet.

14. The cartridge according to claim 1, further comprising a sealing strip disposed in the seal in the region of the conduit, wherein the sealing strip is thicker than the conduit and the conduit passes through the sealing strip, thereby preventing distortion of the walls around the conduit.

15. The cartridge according to claim 14, wherein the sealing strip is a glue.

16. The cartridge according to claim 14, wherein the sealing strip is provided in the form of a solid layer.

17. The cartridge according to claim 14, wherein the sealing strip is provided in the form of a solid layer.

18. The cartridge according to claim 14, wherein the sealing strip is provided with a keying feature and the conduit has a corresponding keying feature such that the conduit can engage with the sealing strip in only one orientation, thereby defining the rotation and position of the conduit relative to the sachet.

19. The cartridge according to claim 18, wherein the keying feature of the sealing strip is a shaped groove, and the conduit is shaped in a corresponding way to engage with the shaped groove in only one orientation.

20. The cartridge according to claim 1, wherein the walls have a cover part enveloping the outer end of the conduit, the cover part being provided with a weakened region allowing the cover part to be torn from the sachet, thereby exposing the outer end of the conduit.

21. The cartridge according to claim 20, wherein the weakened region comprises one or more notches provided in the cover part.

22. A cartridge according to claim 1, wherein the housing has a pair of releasing parts that are pushed together by an actuating part of the receiving port so as to move the one or more bars apart into the dispensing position.

23. A cartridge according to claim 1, wherein the closure member is mounted at one end of a lever arm which is mounted on a pivot, and the other end of the lever arm cooperates in use with an actuating part of the receiving port so as to rotate the lever arm about the pivot, thereby moving the closure member to the dispensing position.

24. A cartridge according to claim 1, wherein the closure member is mounted on an arm that is slidable in the direction of the longitudinal axis of the conduit, and the arm engages with an actuating part of the receiving port so as to slide the arm and closure member into the dispensing position.

25. A cartridge according to claim 1, wherein the closure member is resiliently biased towards the sealing position such that when the cartridge is removed from the receiving port the closure member returns to the sealing position.

26. A cartridge according to claim 1, wherein the housing is provided with one or more keying features that engage with corresponding keying features in the sachet, thereby defining the orientation and position of the sachet relative to the housing.

27. The cartridge of claim 1 where the additional stimulus is electrical.

28. The cartridge according to claim 1, wherein the conduit diameter sizing changes from inner end to the outer end of the capillary.

* * * * *

UNITED STATES PATENT AND TRADEMARK OFFICE
CERTIFICATE OF CORRECTION

PATENT NO.        : 8,540,172 B2                               Page 1 of 1
APPLICATION NO.   : 11/572674
DATED             : September 24, 2013
INVENTOR(S)       : David Waterman et al.

It is certified that error appears in the above-identified patent and that said Letters Patent is hereby corrected as shown below:

In the Claims
column 18, line 20, claim 16: delete "provided in the form of a solid layer." and replace to read as
--a plastic.--

Signed and Sealed this
Third Day of December, 2013

Margaret A. Focarino
*Commissioner for Patents of the United States Patent and Trademark Office*